US011696331B2

(12) United States Patent
Damnjanovic et al.

(10) Patent No.: US 11,696,331 B2
(45) Date of Patent: Jul. 4, 2023

(54) LOGICAL CHANNEL PRIORITIZATION AND MAPPING TO DIFFERENT NUMEROLOGIES

(71) Applicant: QUALCOMM Incorporated, San Diego, CA (US)

(72) Inventors: Aleksandar Damnjanovic, Del Mar, CA (US); Gavin Bernard Horn, Lo Jolla, CA (US); Keiichi Kubota, Tokyo (JP); Peng Cheng, Beijing (CN); Masato Kitazoe, Hachiouji (JP); Aziz Gholmieh, Del Mar, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/464,642

(22) PCT Filed: Sep. 18, 2017

(86) PCT No.: PCT/CN2017/102035
§ 371 (c)(1),
(2) Date: May 28, 2019

(87) PCT Pub. No.: WO2018/129948
PCT Pub. Date: Jul. 19, 2018

(65) Prior Publication Data
US 2019/0380153 A1 Dec. 12, 2019

(30) Foreign Application Priority Data
Jan. 13, 2017 (WO) ................ PCT/CN2017/071057

(51) Int. Cl.
*H04W 74/08* (2009.01)
*H04W 72/1273* (2023.01)
*H04W 72/23* (2023.01)

(52) U.S. Cl.
CPC ... *H04W 74/0833* (2013.01); *H04W 72/1273* (2013.01); *H04W 72/23* (2023.01)

(58) Field of Classification Search
CPC ......... H04W 74/0833; H04W 72/1273; H04W 72/14; H04W 72/042; H04W 72/1284;
(Continued)

(56) References Cited

U.S. PATENT DOCUMENTS 9,814,040 B2 * 11/2017 Bhushan ............... H04W 72/23
10,334,598 B2 * 6/2019 Loehr ................... H04W 72/56
(Continued)

FOREIGN PATENT DOCUMENTS

CN 104185290 A 12/2014
CN 106255215 A 12/2016
(Continued)

OTHER PUBLICATIONS

International Search Report and Written Opinion—PCT/CN2017/071057—ISA/EPO—Sep. 28, 2017.
(Continued)

*Primary Examiner* — Ayaz R Sheikh
*Assistant Examiner* — Louis Samara
(74) *Attorney, Agent, or Firm* — Norton Rose Fulbright LLP

(57) ABSTRACT

Logical channel prioritization and mapping to different numerologies is disclosed for 5G networks having multiple network slices operable for communication via logical channels associated with different numerologies. For user equipments (UEs) configured to handle multiple numerologies, different rules for mapping logical channels associated with different numerologies may be defined for data and non-data channels. Thus, when new data arrives at a UE for communication via a logical channel associated with a different numerology, the UE checks whether the mapping rules
(Continued)

would allow multiplexing of the new numerology data onto an existing data channel. If no data channel has already been allocated or if an allocated data channel may not include data from the new numerology, then a mapping is followed for specifically requesting resources for communication of the new numerology data. The new mapping may trigger scheduling request or random access procedures specifically associated with the new numerology.

28 Claims, 7 Drawing Sheets

(58) Field of Classification Search
CPC . H04W 72/1278; H04W 76/28; H04W 72/12; H04W 16/10; H04W 52/0274; H04W 72/1242; H04W 28/0278; H04W 52/34; H04W 72/569; H04W 72/04; H04W 72/56; H04L 5/0007; H04L 1/1854; H04L 27/2646; H04J 11/0079
See application file for complete search history.

(56) References Cited

U.S. PATENT DOCUMENTS

| | | | | |
|---|---|---|---|---|
| 10,367,677 | B2 * | 7/2019 | Parkvall | H04W 52/0274 |
| 2012/0057547 | A1 * | 3/2012 | Lohr | H04W 52/34 370/329 |
| 2016/0150532 | A1 * | 5/2016 | Bhushan | H04L 1/1812 370/336 |
| 2016/0269135 | A1 | 9/2016 | Jiang et al. | |
| 2016/0352551 | A1 * | 12/2016 | Zhang | H04L 27/26025 |
| 2017/0013565 | A1 | 1/2017 | Pelletier et al. | |
| 2017/0013612 | A1 | 1/2017 | Nayeb Nazar et al. | |
| 2017/0215171 | A1 * | 7/2017 | Sun | H04L 5/0091 |
| 2017/0230939 | A1 * | 8/2017 | Rudolf | H04W 72/569 |
| 2017/0331670 | A1 * | 11/2017 | Parkvall | H04L 41/0816 |
| 2018/0007673 | A1 * | 1/2018 | Fwu | H04L 27/2602 |
| 2018/0049227 | A1 | 2/2018 | Moon et al. | |
| 2018/0063834 | A1 * | 3/2018 | Abedini | H04W 72/23 |
| 2018/0132208 | A1 * | 5/2018 | Pan | H04W 72/04 |
| 2018/0249483 | A1 * | 8/2018 | Chen | H04W 72/542 |
| 2018/0332539 | A1 * | 11/2018 | Fan | H04W 52/146 |
| 2019/0014505 | A1 * | 1/2019 | Kim | H04B 7/0626 |
| 2019/0132856 | A1 * | 5/2019 | Moon | H04W 72/23 |
| 2019/0150176 | A1 * | 5/2019 | Pelletier | H04W 72/566 370/329 |
| 2019/0174513 | A1 * | 6/2019 | Loehr | H04W 72/23 |
| 2019/0320467 | A1 | 10/2019 | Freda et al. | |
| 2019/0342902 | A1 | 11/2019 | Wu et al. | |

FOREIGN PATENT DOCUMENTS

| | | | | |
|---|---|---|---|---|
| CN | 106330813 | A | 1/2017 | |
| RU | 2723083 | C1 * | 4/2016 | |
| RU | 2723083 | C1 * | 6/2020 | ........... H04L 5/0007 |
| WO | WO-2016130175 | A1 | 8/2016 | |
| WO | WO-2016175981 | A1 | 11/2016 | |
| WO | WO-2016192644 | A1 | 12/2016 | |
| WO | WO-2018030710 | A1 * | 2/2018 | ........ H04W 28/0278 |
| WO | WO-2018031638 | A1 * | 2/2018 | |
| WO | WO-2018061438 | A1 | 4/2018 | |
| WO | WO-2019220648 | A1 * | 11/2019 | |

OTHER PUBLICATIONS

International Search Report and Written Opinion—PCT/CN2017/102035—ISA/EPO—Dec. 7, 2017.
ZTE: "Consideration on Outer Codes for NR", R1-1608976, 3GPP TSG RAN WG1 #86bis, Lisbon, Portugal, Oct. 10-14, 2016, pp. 1-9.
Supplementary European Search Report—EP17891911—Search Authority—Munich—Aug. 5, 2020.
ASUSTEK: "Discussion on Uplink Scheduling Procedure in NR", R2-1700354, 3GPP TSG-RAN WG2 Meeting #NR, Spokane, Washington, USA, Jan. 17-19, 2017, 4 Pages.
CATT: "Further Details of Grant-Based UL Transmission", R1-1712413, 3GPP TSG RAN WG1 Meeting #90, Prague, Czechia, Aug. 21-25, 2017, 3 Pages.
Certificate of Availability of a Certified Patent Document U.S. Appl. No. 62/442,154 in a Digital Library, filed on Jan. 4, 2017, 48 Pages.
Huawei., et al., "LCP with Multiple Numerologies", R2-1700085, 3GPP TSG-RAN WG2 Ad Hoc, Spokane, USA, Jan. 17-19, 2017, 3 Pages.
Intel Corporation: "SR Configuration and UL Data Scheduling", R1-1712591,3GPP TSG RAN WG1 Meeting #90, Prague, P. R. Czechia, Aug. 21-25, 2017, pp. 1-4.
Interdigital Communications: "LCP and Scheduling Aspects for Multiple Numerologies", R2-1700236, 3GPP TSG-RAN WG2 NR Ad Hoc, Spokane, Washington Jan. 17-19, 2017, pp. 1-3.
Panasonic: "Uplink Scheduling Procedure When Supporting Multiple Numerologies", 3GPP TSG RAN WG2 Meeting #96, R2-167797, No. Reno, Nevada, Nov. 14, 2016-Nov. 18, 2016, 3 Pages, Nov. 4, 2016.
Samsung: "Logical Channel Prioritization Considering Multiple Numerologies and/or TTIs", 3GPP TSG RAN WG2 #96, R2-168040, No. Reno, USA, Nov. 14, 2016-Nov. 18, 2016, 5 Pages, Nov. 4, 2016.

* cited by examiner

LOGICAL CHANNEL PRIORITIZATION AND MAPPING TO DIFFERENT NUMEROLOGIES

CROSS-REFERENCE TO RELATED APPLICATIONS

This application claims the benefit of Application No. PCT/CN2017/071057, entitled, "LOGICAL CHANNEL PRIORITIZATION AND MAPPING TO DIFFERENT NUMEROLOGIES," filed on Jan. 13, 2017, and Application No. PCT/CN2017/102035, entitled, "LOGICAL CHANNEL PRIORITIZATION AND MAPPING TO DIFFERENT NUMEROLOGIES," filed on Sep. 18, 2017, the disclosure of both are hereby incorporated by reference in their entirety as if fully set forth below and for all applicable purposes.

BACKGROUND

Field

Aspects of the present disclosure relate generally to wireless communication systems, and more particularly, to logical channel prioritization and mapping to different numerologies.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes obtaining data at a UE for uplink communications, wherein the data is identified for transmission on a first logical channel and first numerology, transmitting a resource allocation request on a non-data channel from the UE to a serving base station for uplink resources configured according to a first mapping to include transmission of the first logical channel and first numerology, receiving an uplink grant of the uplink resources, and transmitting the data on the first logical channel via the uplink resources using the first numerology.

In an additional aspect of the disclosure, an apparatus configured for wireless communication includes means for obtaining data at UE for uplink communications, wherein the data is identified for transmission on a first logical channel and first numerology, means for transmitting a resource allocation request on a non-data channel from the UE to a serving base station for uplink resources configured according to a first mapping to include transmission of the first logical channel and first numerology, means for receiving an uplink grant of the uplink resources, and means for transmitting the data on the first logical channel via the uplink resources using the first numerology.

In an additional aspect of the disclosure, a non-transitory computer-readable medium having program code recorded thereon. The program code further includes code to obtain data at a UE for uplink communications, wherein the data is identified for transmission on a first logical channel and first numerology, code to transmit a resource allocation request on a non-data channel from the UE to a serving base station for uplink resources configured according to a first mapping to include transmission of the first logical channel and first numerology, code to receive an uplink grant of the uplink resources, and code to transmit the data on the first logical channel via the uplink resources using the first numerology.

In an additional aspect of the disclosure, an apparatus configured for wireless communication is disclosed. The apparatus includes at least one processor, and a memory coupled to the processor. The processor is configured to obtain data at a UE for uplink communications, wherein the data is identified for transmission on a first logical channel and first numerology, to transmit a resource allocation request on a non-data channel from the UE to a serving base station for uplink resources configured according to a first mapping to include transmission of the first logical channel and first numerology, to receive an uplink grant of the uplink resources, and to transmit the data on the first logical channel via the uplink resources using the first numerology.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
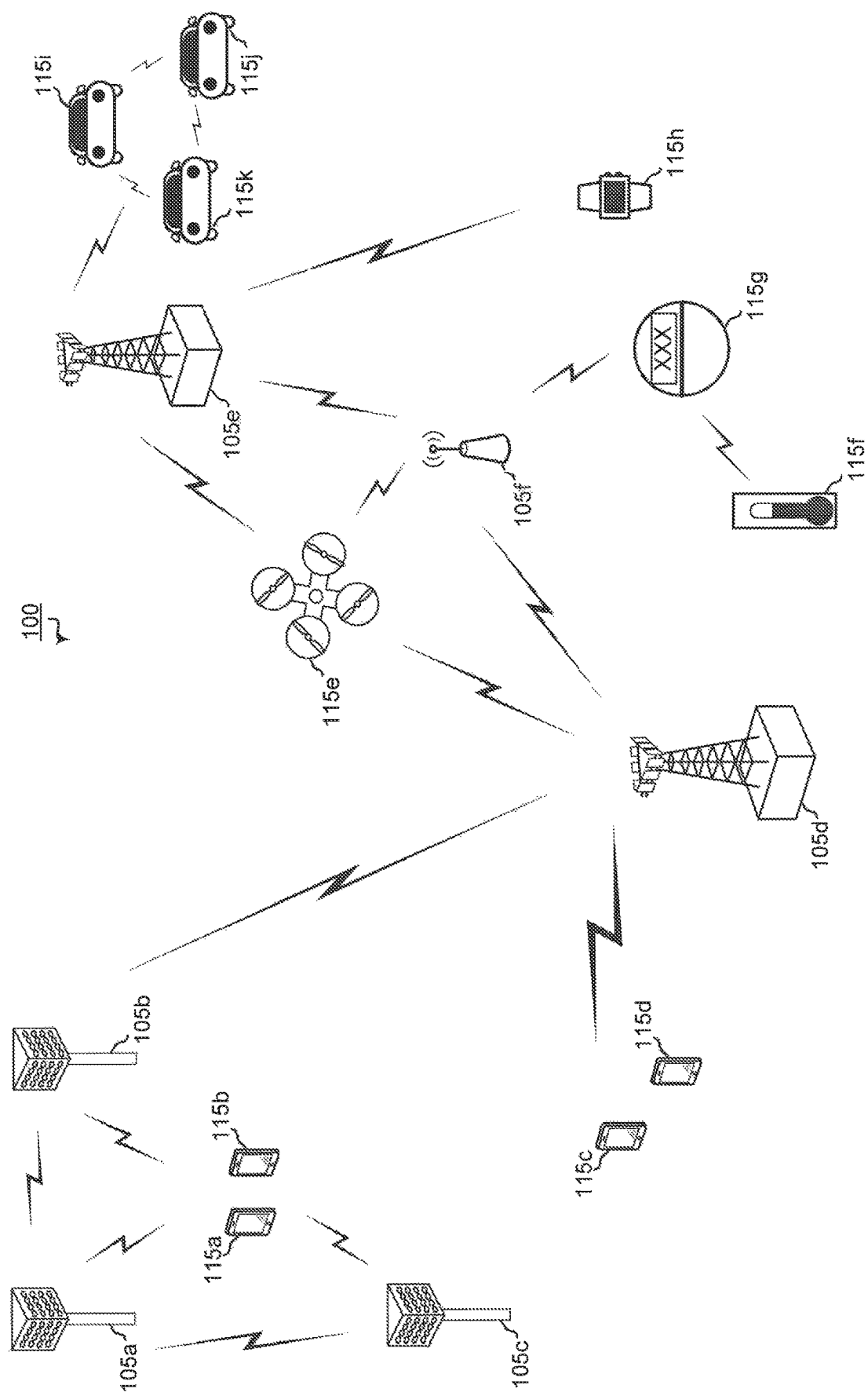
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as next generation NodeB (gNB), a an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (COMP) or multi-connectivity. Macro base station 105*d* performs backhaul communications with base stations 105*a*-105*c*, as well as small cell, base station 105*f* Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105E Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
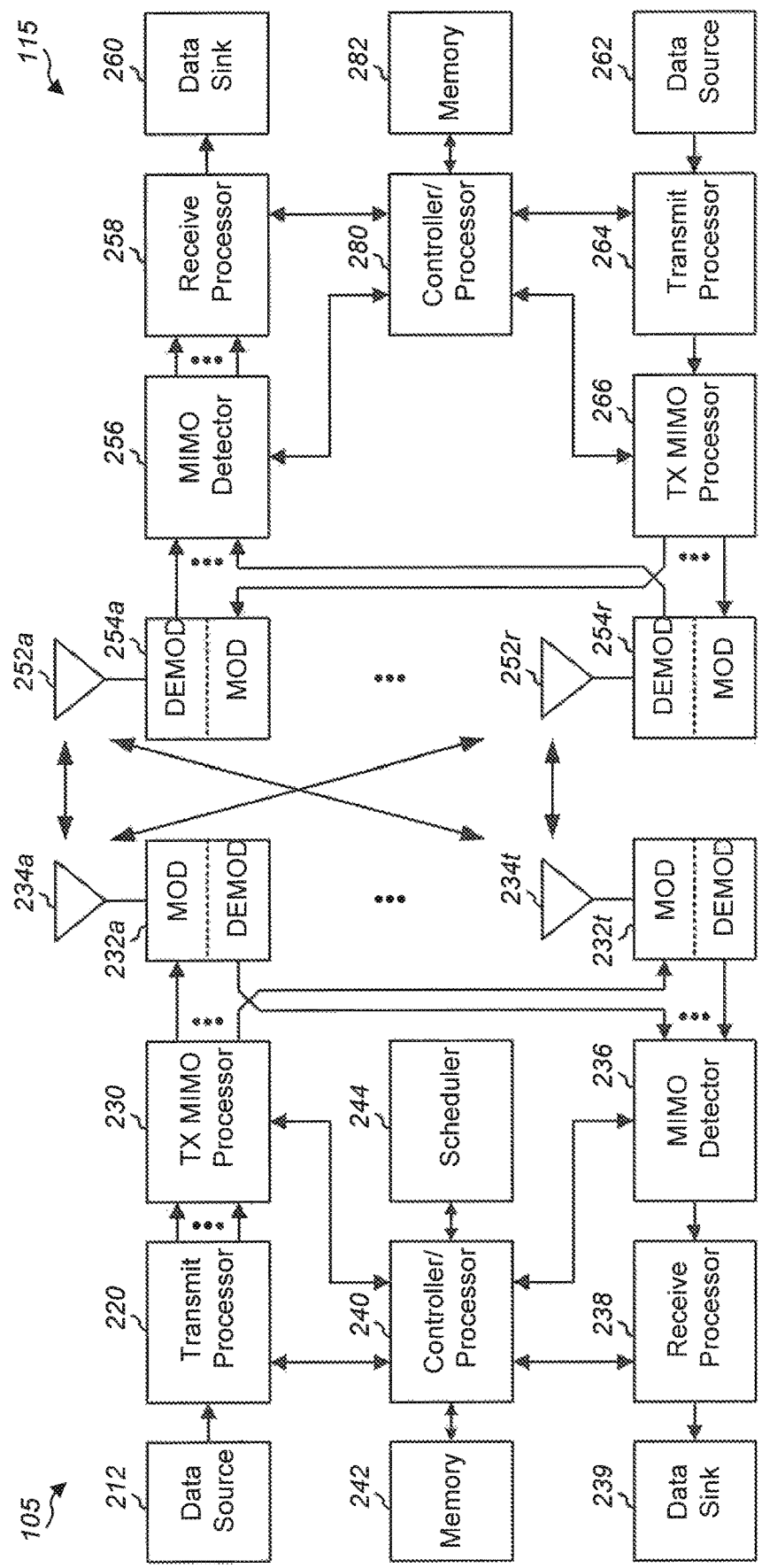
FIG. 2 is a block diagram illustrating a design of a base station/gNB and a UE configured according to one aspect of the present disclosure.

FIG. 2 shows a block diagram of a design of a base station 105 and a UE 115, which may be one of the base stations and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to base station 105. At base station 105, the uplink signals from UE 115 may be received by the antennas 234, processed by the demodulators 232, detected by a MIMO detector 236 if applicable, and further processed by a receive processor 238 to obtain decoded data and control information sent by UE 115. The processor 238 may provide the decoded data to a data sink 239 and the decoded control information to the controller/processor 240.

The controllers/processors 240 and 280 may direct the operation at base station 105 and UE 115, respectively. The controller/processor 240 and/or other processors and modules at base station 105 may perform or direct the execution of various processes for the techniques described herein. The controllers/processor 280 and/or other processors and modules at UE 115 may also perform or direct the execution of the functional blocks illustrated in FIG. 4, and/or other processes for the techniques described herein. The memories 242 and 282 may store data and program codes for base station 105 and UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
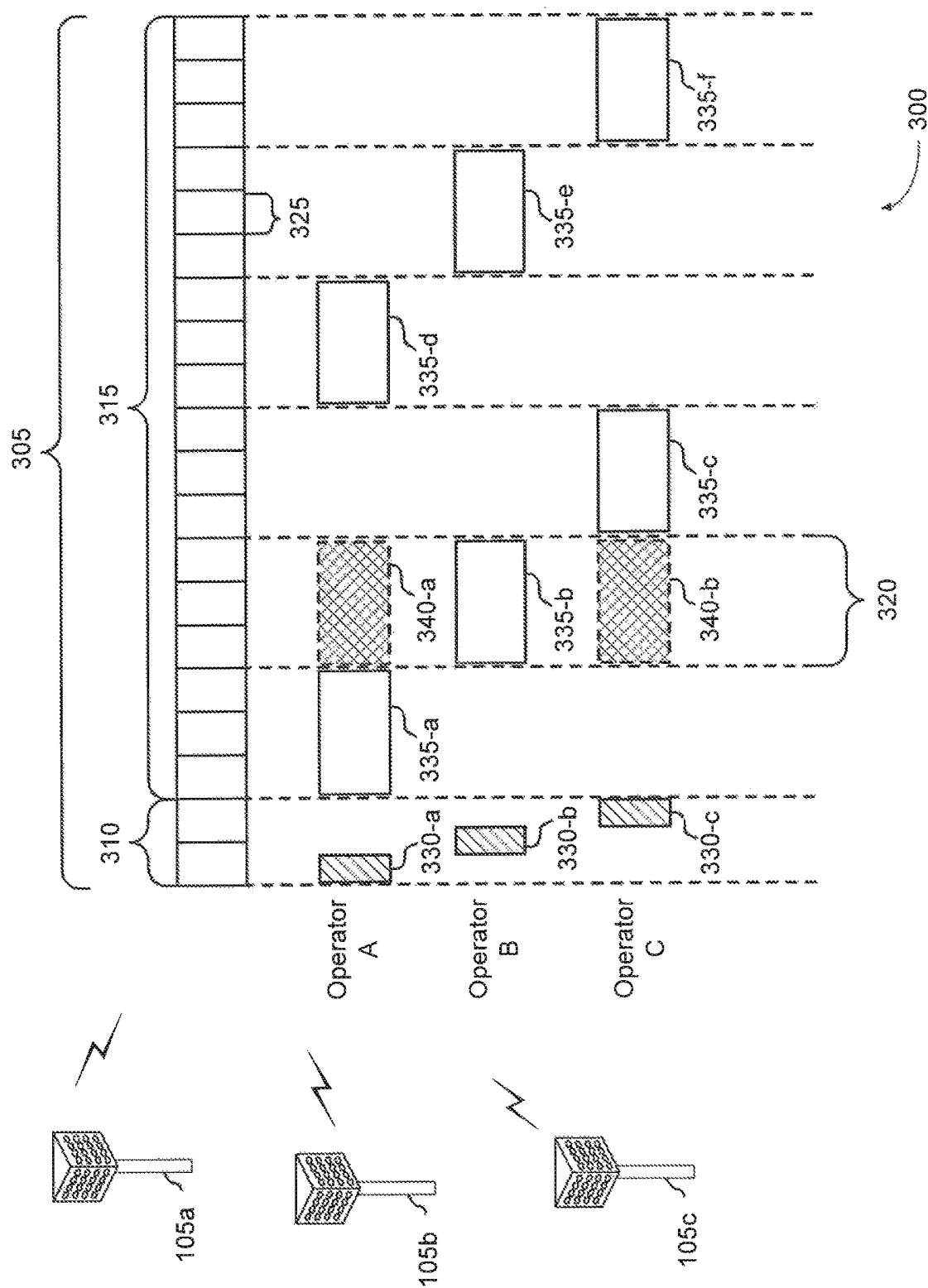
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-TNT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, car A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

5G NR networks are intended to support a variety of diverse use cases with different and varying requirements for latency, throughput, and availability. Three major use cases identified for 5G NR networks includes enhanced mobile broadband (eMBB), which enhances data capacity and throughput; massive machine type communications (mMTC), which provides improved link budgets, low device complexity, and long battery life within a highly dense deployment; and ultra-reliable low latency communications (URLLC), which provides high reliability (low packet error rate) and low latency. They dynamic network slicing concept offers a way to optimize 5G NR networks to address such disparate use cases efficiently. Dynamic network slicing enables the design, deployment, customization, and optimization of different network slices running on a common network infrastructure. Network slicing may be implemented using various techniques, such as software-defined networking (SDN), network function virtualization (NFV), and the like. Virtualization may enable separation of functionalities and offer the ability to instantiate multiple functions on a common infrastructure. With this approach, the infrastructure can be shared by different entities and provide different services.

Each of the many different use cases for 5G NR networks include different quality of service (QoS) levels depending on the focus of the use case. For example, URLLC requirements stress high reliability and low latency. Therefore, the QoS for URLLC may be quite different from the QoS of eMBB, which focuses more on enhanced data capacity. Accordingly, each use case may be associated with a different numerology for implementing the network with consideration for meeting the specific QoS requirements intended. The particular numerology used may be set according to standards or may be implicitly derived through the numerology of synchronization signals, such as PSS, SSS, or physical broadcast channel (PBCH) signals.

A numerology includes multiple parameters that may be modified to achieve the particular performance goals and QoS requirements of the communication, Numerology parameters include such parameters as transmission time interval (TTI) duration, number of symbols, subcarrier spacing, cyclic prefix (CP) duration, CP overhead, number of resource elements (REs) per TTI, and the like. Changing the values of the numerology parameters changes the service characteristics of the communications. For example, changing the TTI duration will affect the latency of the communication. CP duration may relate to the systematic overhead, which may have an effect on the reliability of the communication. Subcarrier spacing may affect how phase noise is observed, such as in communications from low cost devices with poor quality hardware. The number of symbols per TTI may also affect throughput or capacity of the communications and is generally determined based on the subcarrier spacing, CP overhead, and effective systems bandwidth. Thus, multiple numerologies may be defined to address various different use cases and QoS requirements.

In 5G NR networks, UEs may be configured to handle multiple different numerologies. The base stations may be able to control which logical channels can be mapped to which numerology or numerologies through various signaling mechanisms, such as system information block (SIB) messaging, minimum or on-demand system information (SI) messaging procedures, or the like. At the time when the medium access control (MAC) layer is requested to provide MAC protocol data units (PDUs), the MAC layer may execute the logical channel prioritization (LCP) and multiplexing functions. Each numerology has different service characteristics that are beneficial to the type of traffic intended. Thus, LCP may be executed separately for each numerology. The traffic associated with the logical channels allowed to be transmitted over given numerology should be considered in each case.

In order to ensure the desired QoS, the mapping rules should be followed to prevent traffic for one numerology from being sent using a different numerology that may not be adequate. For example, ultra-reliable low latency communication (URLLC) traffic should not be sent using enhanced mobile broadband (eMBB) numerology due to the latency and reliability differences that the numerologies for these two use cases provide. While relatively straightforward in implementation on the downlink side at the base station, control of uplink mapping may be more complicated, as uplink traffic associated with one numerology may not be compatible or efficient when multiplexed with uplink traffic associated with a different numerology—even when there is room in the MAC PDU for the additional payload. For example, a UE that is configured to handle both URLLC traffic and eMBB traffic may not be allowed to multiplex traffic from logical channels mapped to the eMBB numerology with traffic from logical channels that are mapped to the URLLC numerology. The eMBB numerology may simply not support the QoS requirements of the URLLC service and, in order for the network to provide the desired QoS, the UE should be configured to map the traffic associated with the two different numerologies separately. In addition to the different mappings between logical channel priorities and numerologies for data channels, aspects of the present disclosure are directed to mapping between logical channel priorities and numerologies for non-data channels that may be different from the mappings for the data channels.

Figure 4:
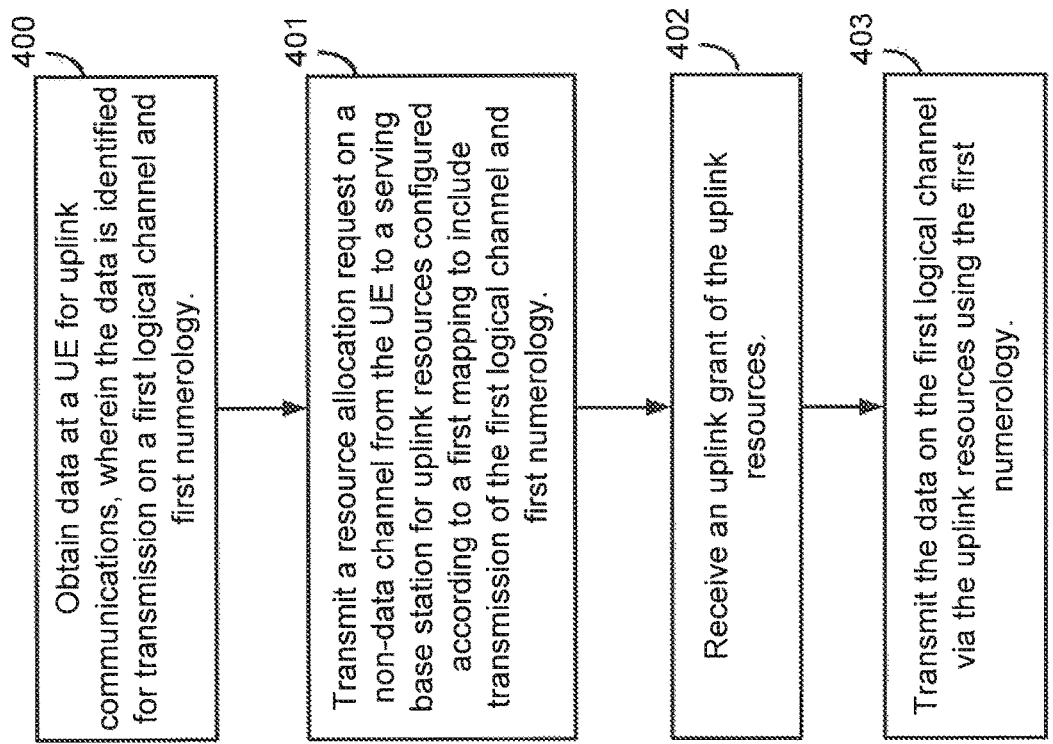
FIG. 4 is a block diagram illustrating example blocks executed to implement one aspect of the present disclosure.
Figure 8:
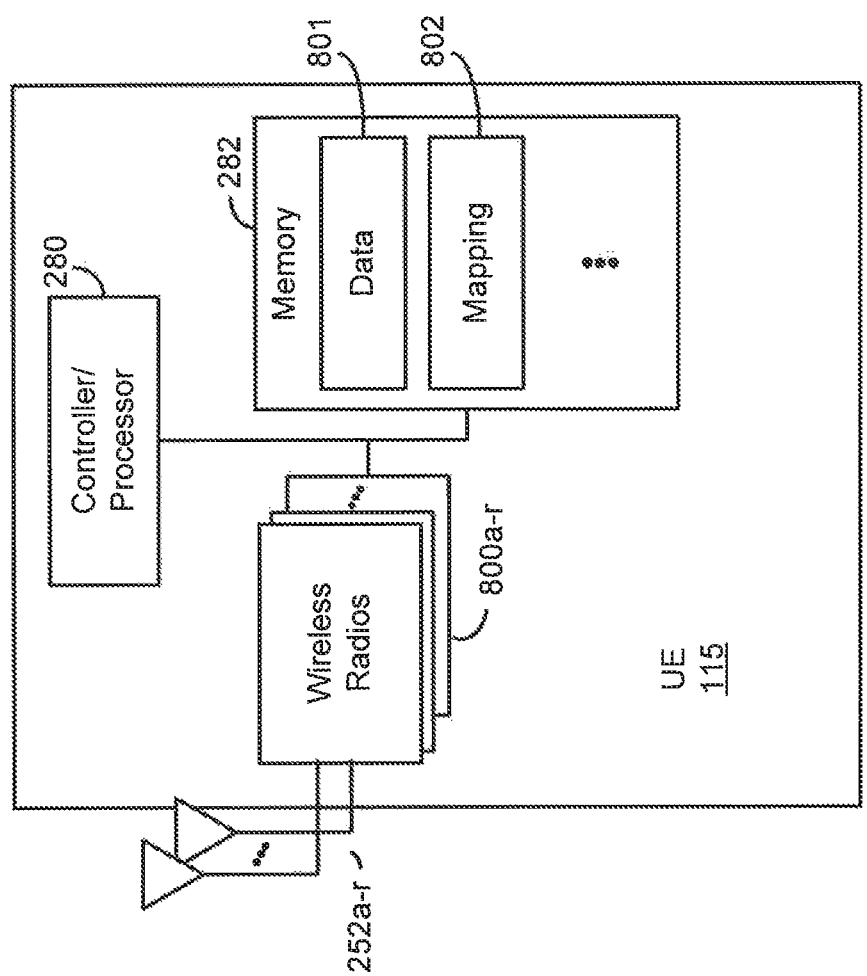
FIG. 8 is a block diagram illustrating an example UE configured according to one aspect of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE obtains data for uplink communications, wherein the data is identified for transmission on a first logical channel and first numerology. For example, the data received by UE 115 for transmission with the first numerology is either new data while UE 115 is idle or data associated with a numerology that is different from the numerology of the data in the currently transmitted logic channel. The data may be stored in memory 282 at data 801. The data obtained for transmission may be received via antennas 252a-r and wireless radios 800a-r or may be created at UE 115. Under control of controller/processor 280, UE 115 executes mapping logic 802, stored in memory 282. The execution environment of mapping logic 802 allows UE 115 to recognize that the numerology of the data, including whether the data has a different numerology than data that is currently transmitted in the logical channel.

At block 401, the UE transmits a resource allocation request on a non-data channel from the UE to a serving base station for uplink resources configured according to a first mapping to include transmission of the first logical channel and first numerology, Within the execution environment of mapping logic 802, the arrival of the data with the different numerology triggers UE 115, under control of controller/processor 280, either a scheduling request via PUCCH, a random access procedure, or an on-demand system information (SI) messaging procedure. The triggered request may be transmitted to the serving base station via wireless radios 800a-r and antennas 252a-r.

At block 402, the UE receives an uplink grant of the uplink resources. The resource allocation request (e.g., SR, RACH, etc.) received through antennas 252a-r and wireless radios 800*a-r* by UE 115 via the non-data channel requests a resource allocation for uplink communications on the associated first logical channel and first numerology. The base station will respond with a specific resource grant mapped to the first logical channel and first numerology.

At block 403, the UE transmits the data on the first logical channel via the uplink resources using the first numerology. Using the requested resources received from the serving base station, UE 115 may transmit data, in data 801, using wireless radios 800*a-r* and antennas 252*a-r*.

The mappings between numerologies may apply also to the non-data channels, such as random access, scheduling request, or on-demand SI channels. Currently, when data arrives at a UE for uplink transmission on a particular logical channel, if the logical channel is for a logical channel group (LCG) with a higher priority than the data currently in the transmit buffer, then a scheduling request (SR) is triggered. The base station may have configured the UE for SRs in previously communicated RRC messages. Thus, when the new data triggers the SR, the UE may already have a valid PUCCH resource for transmitting the SR. However, if no resources have been allocated for the PUCCH, the UE will initiate the random access procedure to obtain new resource allocation for the uplink transmission. However, if a UE is performing eMBB communications and URLLC data arrives, a SR to the base station for new eMBB resources would not be adequate for the uplink transmission of URLLC data. Alternatively, the UE may initiate an on-demand SI procedure for obtaining the system information including the mappings for the logical channels and numerologies. Therefore, according to aspects of the present disclosure, a mapping may be defined for the UE to specifically request resource allocation using the numerology associated with the logical channel that the data is intended for. For example, data arrival on a specific radio bearer mapped to specific logical channel and numerology implies that the UE should trigger either the random access procedure, scheduling request, or SI procedures with the corresponding numerology.

Figure 5:
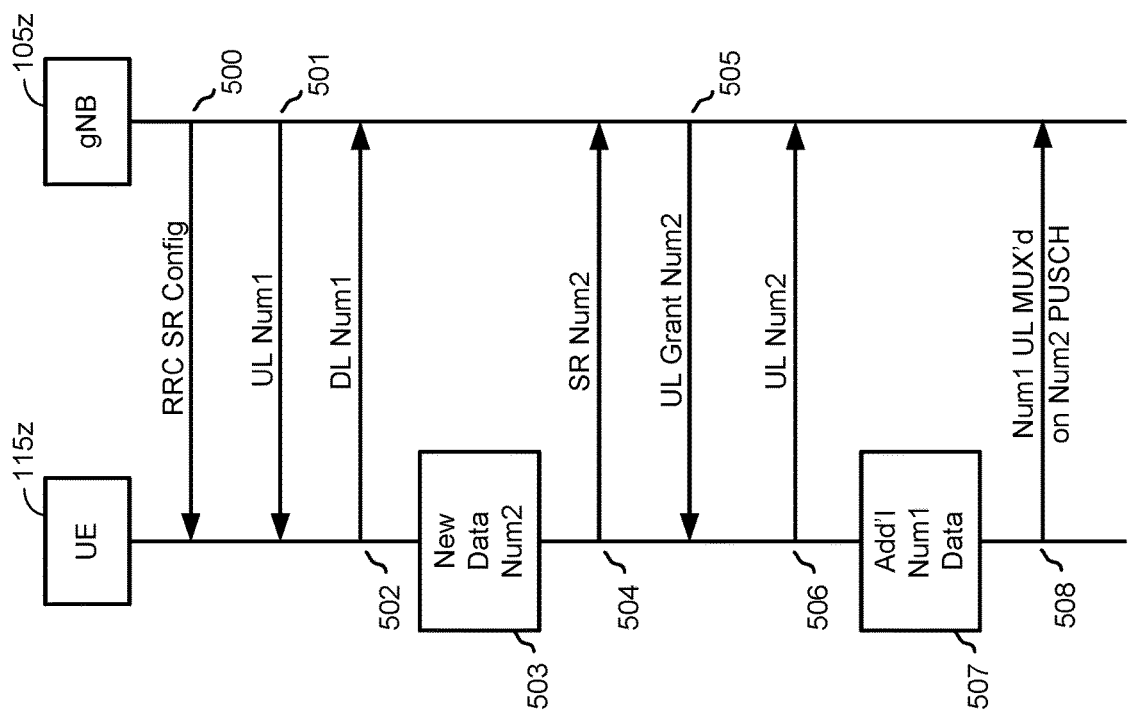
FIG. 5 is a block diagram illustrating a UE and gNB configured according to one aspect of the present disclosure.

FIG. 5 is a block diagram illustrating a UE 115*z* and gNB 105*z* configured according to one aspect of the present disclosure. At 500, gNB 105*z* sends an RRC SR configuration message that allocates resources for PUCCH for data associated with different logical channels and multiple numerologies. At 501 and 502, uplink and downlink communications occur between gNB 105*z* and UE 115*z* via a logical channel associated with a first numerology (Num1). At 503, new data arrives at UE. 415*z*. The new data is for communication over a logical channel associated with a second numerology (Num2). The logical channel associated with the second numerology has priority over the logical channel associated with the first numerology. In response to the new data at 503, UE 115*z* triggers the SR procedure. Because it has been configured for PUCCH resources associated with the logical channel of the second numerology within the RRC SR configuration message at 500, UE 115*z*, at 504, transmits an SR to gNB 105*z* request resource allocation for uplink transmission over the logical channel associated with the second numerology. At 505, gNB 105*z* sends the uplink grant for the logical channel associated with the second numerology. UE 115*z* may then begin uplink transmissions, at 506, of the new data on the logical channel associated with the second numerology.

These mapping rules between logical channels and numerologies that apply for the non-data channels, such as the random access channel and scheduling request channel, may be different from the mapping rules that apply for the data channels. The network may configure separate rules for prioritization and mapping between logical channels and configured non-data and data channels associated with multiple numerologies and network slices. For example, at 507, UE 115*z* receives additional data for the previous logical channel communications associated with the first numerology. However, the logical channel associated with the first numerology is a lower priority than the logical channel associated with the second numerology. Therefore, the additional data for the first numerology would not trigger a new buffer status report (BSR) or SR. Because the mapping rules for data channels may be different than the mapping rules for the non-data channels, UE 115*z* multiplexes the data for the logical channel associated with the first numerology onto the data channel (PUSCH) with resources allocated for the logical channel associated with the second numerology. The mapping rules allow the first numerology data to be multiplexed onto the resources associated with the second numerology because, in the illustrated example, the QoS requirements associated with the first numerology are lower than the QoS requirements associated with the second numerology. When the data for the logical channel associated with the second numerology was received at 503, the mapping rules for the current data channel associated with the first numerology would not allow multiplexing of the higher priority second numerology data into the available payload, instead triggering the SR procedure specifically for the logical channel associated with the second numerology.

Figure 6:
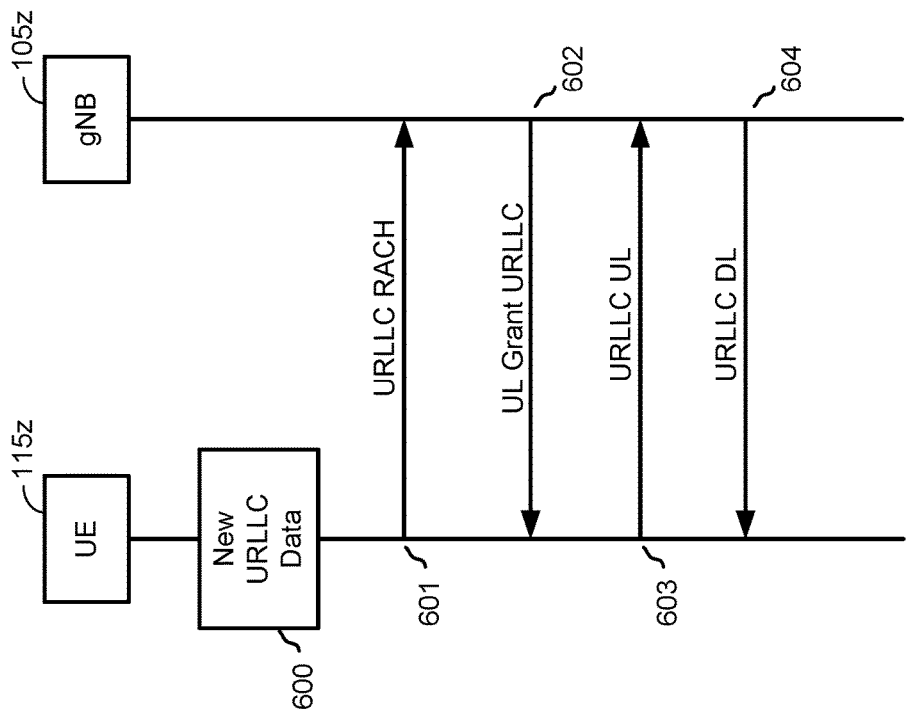
FIG. 6 is a block diagram illustrating a UE and a gNB configured according to one aspect of the present disclosure.

FIG. 6 is a block diagram illustrating a UE 115*z* and a gNB 105*z* configured according to one aspect of the present disclosure. At 600, UE 115*z* receives new URLLC data for transmission. URLLC data is associated with a high reliability numerology. Without any current resources granted for either a control or data channel associated with a URLLC numerology, UE 115*z* triggers a URLLC RACH at 601. The URLLC RACH specifically requests access to the network via resources using a URLLC compatible numerology. At 602, gNB 105*z* responds with the uplink grant specifically for a URLLC-compatible numerology. After receiving the uplink grant with the URLLC numerology, uplink and downlink URLLC data may be communicated at 603 and 604 using the specific. URLLC-compatible numerology.

Figure 7:
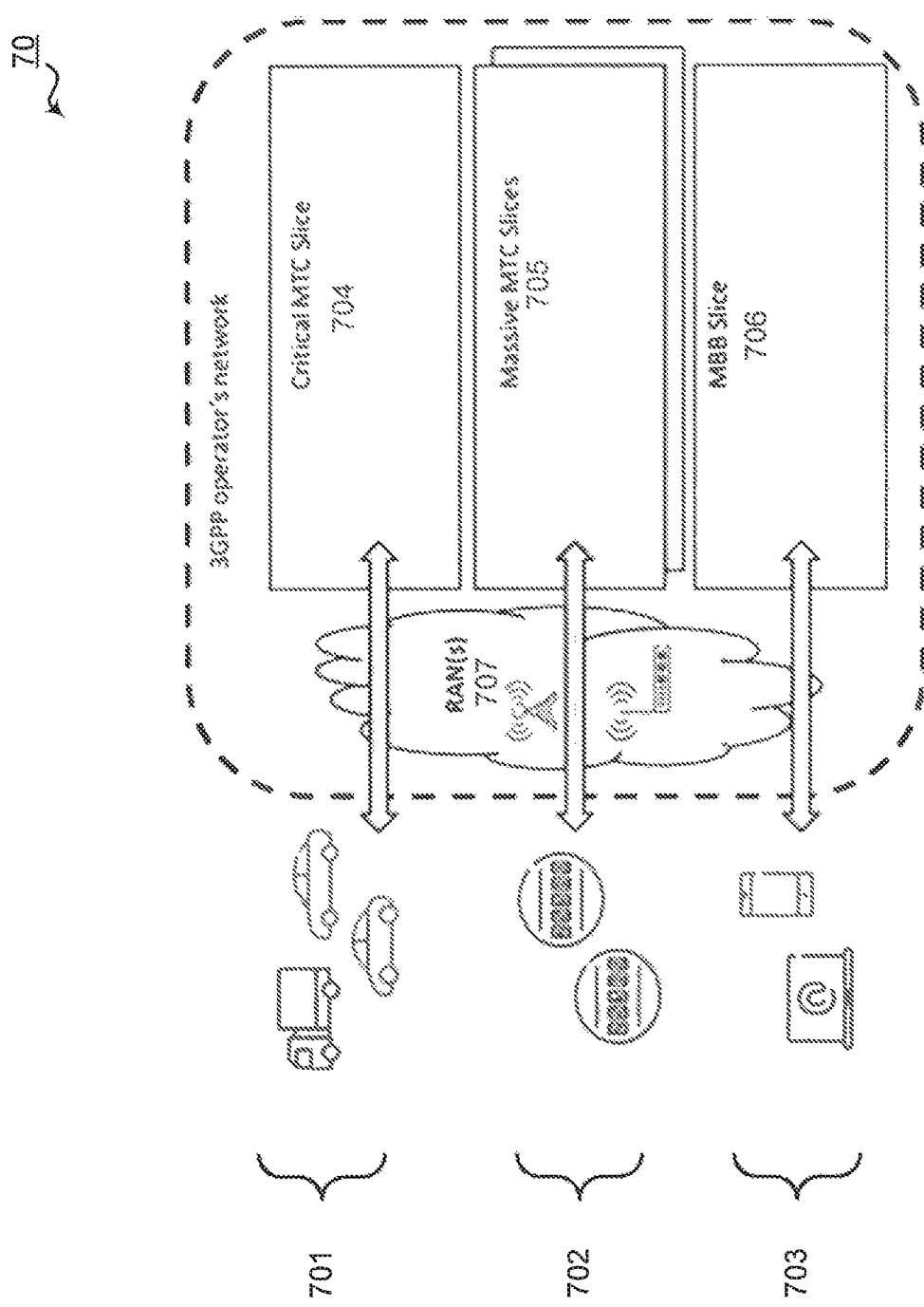
FIG. 7 is a block diagram illustrating a 5G NR network configured according to one aspect of the present disclosure.

FIG. 7 is a block diagram illustrating a 5G NR network 70 configured according to one aspect of the present disclosure. 5G NR network 70 may be divided into multiple network slices according to various use cases and numerologies to support URLLC UEs 701, MTC UEs 702, and high data UEs 703. For example, URLLC UEs 701 may be supported by critical MTC slice 704. Critical MTC slice 704 uses a numerology that supports URLLC communications with mission-critical type devices, such as URLLC UEs 701. Similarly, MTC UEs 702 may be supported by massive MTC slice 705. Massive MTC slice 705 uses a different numerology for communications that may have a higher phase drift or higher phase noise based on transmissions from the massive number of low costs devices, such as MTC UEs 702. High data UEs 703 may be supported by MBB slice 706. MBB slice 706 uses a still different numerology that supports a higher data capacity or throughput to high data UEs 703. Each network slice is implemented using the same underlying core 5G NR network 70, including multiple radio access networks (RANs) 707 supporting the physical communications between the slices of 5G NR network 70 and URLLC UEs 701, MTC UEs 702, and high data UEs 703.

In controlling uplink and downlink communication, different mapping rules between logical channels and numerologies may be implemented for both data and non-data channels within 5G NR network 70. When the UEs are configured to handle multiple numerologies, the base stations within RANs 707 may signal the mappings and mapping rules for mapping between logical channels and numerologies for both data channels and non-data channels, such as random access, scheduling request, or on-demand SI channels. Massive MTC devices, such as MTC UEs 702 may only be configured for a single numerology in order to keep their costs low and to conserve finite battery or power resources. However, URLLC UEs 701 and high data UEs 703 may be configured to handle more than one numerology. These UEs may then following the mapping rules depending on the numerology that the data for the logical channels may be associated with.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4, and/or other processes for the techniques described herein, may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers, Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
obtaining data at a user equipment (UE) for uplink communications, wherein the data is identified for transmission on a first logical channel, and wherein the first logical channel is associated with a first numerology;
transmitting a resource allocation request, from the UE to a serving base station via a non-data channel, to request uplink resources for uplink communications on the first logical channel, wherein the uplink resources are configured for the first logical channel according to a first mapping;
receiving an uplink grant of the uplink resources; and
transmitting the data on the first logical channel via the uplink resources using the first numerology.

2. The method of claim 1,
wherein the non-data channel includes one of: an uplink control channel for scheduling requests, a random access channel, or an on-demand system information messaging; and
wherein the resource allocation request is transmitted on the uplink control channel when the uplink control channel is allocated for the UE and the resource allocation request is transmitted on the random access channel when the uplink control channel is unallocated for the UE.

3. The method of claim 1, wherein the first logical channel and first numerology are one of:
indicated in one of a minimum system information messaging or the on-demand system information messaging;
derived through a numerology of synchronization signals; or
stored in memory at the UE as standardized functionality.

4. The method of claim 1, further including:
determining, at the UE prior to the transmitting the resource allocation request, a data channel is inactive for the UE.

5. The method of claim 4, further including:
determining, at the UE prior to the transmitting the resource allocation request, the data channel is active for the UE;
determining, at the UE, whether the data channel is configured to include transmission of the first logical channel according to a second mapping;
in response to the data channel being configured to include transmission of the first logical channel,
refraining, by the UE, from performing the transmitting the resource allocation request, the receiving the uplink grant, and the transmitting data via the uplink resources when the data channel is configured to include the transmission of the first logical channel; and
transmitting, by the UE, the data on the first logical channel via the data channel using the first numerology.

6. The method of claim 5, further including:
in response to the data channel not being configured to include transmission of the first logical channel performing the transmitting the resource allocation, the receiving the uplink grant, and the transmitting the data via the uplink resources.

7. The method of claim 5, wherein the second mapping is different from the first mapping.

8. The method of claim 1, wherein the first numerology includes one of:
a transmission time interval (TTI) duration parameter;
a number of symbols parameter;
a subcarrier spacing parameter;
a cyclic prefix (CP) duration parameter;
a CP overhead parameter; or
a number of resource elements (REs) per TTI parameter.

9. The method of claim 8, wherein the first numerology includes the TTI duration parameter.

10. An apparatus configured for wireless communication, comprising:
means for obtaining data at a user equipment (UE) for uplink communications, wherein the data is identified for transmission on a first logical channel, and wherein the first logical channel is associated with a first numerology;
means for transmitting a resource allocation request, from the UE to a serving base station via a non-data channel, to request uplink resources for uplink communications on the first logical channel, wherein the uplink resources are configured for the first logical channel according to a first mapping;
means for receiving an uplink grant of the uplink resources; and
means for transmitting the data on the first logical channel via the uplink resources using the first numerology.

11. The apparatus of claim 10,
wherein the non-data channel includes one of: an uplink control channel for scheduling requests, a random access channel, or an on-demand system information messaging; and
wherein the resource allocation request is transmitted on the uplink control channel when the uplink control channel is allocated for the UE and the resource allocation request is transmitted on the random access channel when the uplink control channel is unallocated for the UE.

12. The apparatus of claim 10, wherein the first logical channel and first numerology are one of:
indicated in one of a minimum system information messaging or the on-demand system information messaging;
derived through a numerology of synchronization signals; or
stored in memory at the UE as standardized functionality.

13. The apparatus of claim 10, further including:
means for determining, at the UE prior to execution of the means for transmitting the resource allocation request, a data channel is inactive for the UE.

14. The apparatus of claim 13, further including:
means for determining, at the UE prior to execution of the means for transmitting the resource allocation request, the data channel is active for the UE;
means for determining, at the UE, whether the data channel is configured to include transmission of the first logical channel according to a second mapping;
means, executable in response to the data channel being configured to include transmission of the first logical channel,
for refraining, by the UE, from performing the means for transmitting the resource allocation request, the means for receiving the uplink grant, and the means for transmitting data via the uplink resources when the data channel is configured to include the transmission of the first logical channel; and means for transmitting, by the UE, the data on the first logical channel via the data channel using the first numerology.

15. The apparatus of claim 14, further including:

means, executable in response to the data channel not being configured to include transmission of the first logical channel, for performing the means for transmitting the resource allocation, the means for receiving the uplink grant, and the means for transmitting the data via the uplink resources.

16. The apparatus of claim 14, wherein the second mapping is different from the first mapping.

17. The apparatus of claim 10, wherein the first numerology includes one of:

a transmission time interval (TTI) duration parameter;
a number of symbols parameter;
a subcarrier spacing parameter;
a cyclic prefix (CP) duration parameter;
a CP overhead parameter; or
a number of resource elements (REs) per TTI parameter.

18. The apparatus of claim 17, wherein the first numerology includes the TTI duration parameter.

19. A non-transitory computer-readable medium having program code recorded thereon, the program code comprising:

program code executable by a computer for causing the computer to obtain data at a user equipment (UE) for uplink communications, wherein the data is identified for transmission on a first logical channel, and wherein the first logical channel is associated with a first numerology;

program code executable by the computer for causing the computer to transmit a resource allocation request, from the UE to a serving base station via a non-data channel, to request uplink resources for uplink communications on the first logical channel, wherein the uplink resources are configured for the first logical channel according to a first mapping;

program code executable by the computer for causing the computer to receive an uplink grant of the uplink resources; and program code executable by the computer for causing the computer to transmit the data on the first logical channel via the uplink resources using the first numerology.

20. An apparatus configured for wireless communication, the apparatus comprising:

at least one processor; and
a memory coupled to the at least one processor,
wherein the at least one processor is configured:

to obtain data at a user equipment (UE) for uplink communications, wherein the data is identified for transmission on a first logical channel, and wherein the first logical channel is associated with a first numerology;

to transmit a resource allocation request, from the UE to a serving base station via a non-data channel, to request uplink resources for uplink communications on the first logical channel, wherein the uplink resources are configured for the first logical channel according to a first mapping;

to receive an uplink grant of the uplink resources; and to transmit the data on the first logical channel via the uplink resources using the first numerology.

21. The apparatus of claim 20, wherein the non-data channel includes one of: an uplink control channel for scheduling requests, a random access channel, or an on-demand system information messaging; and wherein the resource allocation request is transmitted on the uplink control channel when the uplink control channel is allocated for the UE and the resource allocation request is transmitted on the random access channel when the uplink control channel is unallocated for the UE.

22. The apparatus of claim 20, wherein the first logical channel and first numerology are one of:

indicated in one of a minimum system information messaging or the on-demand system information messaging;

derived through a numerology of synchronization signals; or stored in memory at the UE as standardized functionality.

23. The apparatus of claim 20, further including configuration of the at least one processor to determine, at the UE prior to execution of the configuration of the at least one processor to transmit the resource allocation request, a data channel is inactive for the UE.

24. The apparatus of claim 23, further including configuration of the at least one processor:

to determine, at the UE prior to execution of the configuration to transmit the resource allocation request, the data channel is active for the UE;

to determine, at the UE, whether the data channel is configured to include transmission of the first logical channel according to a second mapping;

in response to the data channel being configured to include transmission of the first logical channel, to refrain, by the UE, from performing the transmitting the resource allocation request, the receiving the uplink grant, and the transmitting data via the uplink resources when the data channel is configured to include the transmission of the first logical channel; and to transmit, by the UE, the data on the first logical channel via the data channel using the first numerology.

25. The apparatus of claim 24, further including configuration of the at least one processor in response to the data channel not being configured to include transmission of the first logical channel to execute the configuration to transmit the resource allocation, the configuration to receive the uplink grant, and the configuration to transmit the data via the uplink resources.

26. The apparatus of claim 24, wherein the second mapping is different from the first mapping.

27. The apparatus of claim 20, wherein the first numerology includes one of:

a transmission time interval (TTI) duration parameter;
a number of symbols parameter;
a subcarrier spacing parameter;
a cyclic prefix (CP) duration parameter;
a CP overhead parameter; or
a number of resource elements (REs) per TTI parameter.

28. The apparatus of claim 27, wherein the first numerology includes the TTI duration parameter.

* * * * *